United States Patent
Lu et al.

(10) Patent No.: US 10,170,756 B2
(45) Date of Patent: Jan. 1, 2019

(54) LI₂S BATTERIES HAVING HIGH CAPACITY, HIGH LOADING, AND HIGH COULOMBIC EFFICIENCY

(71) Applicant: UChicago Argonne, LLC, Chicago, IL (US)

(72) Inventors: Jun Lu, Bolingbrook, IL (US); Rui Xu, Westmont, IL (US); Khalil Amine, Oakbrook, IL (US); Xiulei Ji, Corvallis, OR (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 463 days.

(21) Appl. No.: 14/971,676

(22) Filed: Dec. 16, 2015

(65) Prior Publication Data

US 2017/0179474 A1  Jun. 22, 2017

(51) Int. Cl.
| | | |
|---|---|---|
| *H01M 4/36* | (2006.01) | |
| *H01M 4/58* | (2010.01) | |
| *H01M 4/587* | (2010.01) | |
| *H01M 10/052* | (2010.01) | |
| *H01M 4/62* | (2006.01) | |
| *H01M 4/04* | (2006.01) | |
| *B82Y 30/00* | (2011.01) | |

(52) U.S. Cl.
CPC ......... *H01M 4/366* (2013.01); *H01M 4/0471* (2013.01); *H01M 4/587* (2013.01); *H01M 4/5815* (2013.01); *H01M 4/625* (2013.01); *H01M 10/052* (2013.01); *B82Y 30/00* (2013.01); *Y10S 977/735* (2013.01); *Y10S 977/842* (2013.01)

(58) Field of Classification Search
CPC .. H01M 4/366; H01M 4/0471; H01M 10/052; H01M 4/587; H01M 4/5815; H01M 4/625; B82Y 30/00; Y10S 977/842; Y10S 977/735
USPC ....................................................... 429/231.8
See application file for complete search history.

(56) References Cited

U.S. PATENT DOCUMENTS

| | | |
|---|---|---|
| 8,609,183 B2 | 12/2013 | Wang et al. |
| 2011/0256049 A1 | 10/2011 | Dickinson et al. |
| 2012/0068124 A1 | 3/2012 | Dickinson et al. |
| 2012/0088154 A1 | 4/2012 | Liu et al. |
| 2013/0337347 A1 | 12/2013 | Pol et al. |
| 2014/0255795 A1 | 9/2014 | Manthiram et al. |
| 2014/0272545 A1* | 9/2014 | Saito ............. H01M 4/136 429/163 |

(Continued)

OTHER PUBLICATIONS

A. Manthiram, "Materials Challenges and Opportunities of Lithium Ion Batteries," J. Phys. Chem. Lett. 2011, 2, 176-184.

*Primary Examiner* — Gary D Harris
(74) *Attorney, Agent, or Firm* — Foley & Lardner LLP

(57) ABSTRACT

An electrochemical device includes a cathode containing graphene-wrapped Li₂S nanoparticles. The graphene-wrapped Li₂S nanoparticles are prepared by a method including heating lithium metal, and a carbon-sulfur source or a carbon source and a sulfur source in a sealed container at a temperature to produce lithium vapors, and vapors of the carbon-sulfur source or vapors of the carbon source and vapors of the sulfur source; and cooling the sealed container to produce the graphene-wrapped Li₂S nanoparticles.

12 Claims, 13 Drawing Sheets

(56) References Cited

U.S. PATENT DOCUMENTS

2014/0272610 A1 9/2014 Amine et al.
2015/0010825 A1 1/2015 Yang et al.
2016/0329559 A1* 11/2016 Cairns .................... C01B 17/24

* cited by examiner

LI₂S BATTERIES HAVING HIGH CAPACITY, HIGH LOADING, AND HIGH COULOMBIC EFFICIENCY

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to electroactive materials and batteries containing such electroactive materials, and methods to prepare the electroactive materials and batteries containing the same. More specifically, the present technology is related to graphene-wrapped $Li_2S$ nanoparticles as electroactive materials.

SUMMARY

In one aspect, provided herein are electrochemical devices including a cathode including graphene-wrapped $Li_2S$ nanoparticles, wherein the graphene-wrapped $Li_2S$ nanoparticles are prepared by a method including heating lithium metal, and a carbon-sulfur source or a carbon source and a sulfur source in a sealed container at a temperature to produce lithium vapors, and vapors of the carbon-sulfur source or vapors of the carbon source and vapors of the sulfur source; and cooling the sealed container to produce the graphene-wrapped $Li_2S$ nanoparticles. In some embodiments, the electrochemical device further includes an anode and a separator. In some embodiments, the anode is a metallic lithium anode. In some embodiments, the anode is substantially free of metallic lithium.

In another aspect, provided herein are cathodes including graphene-wrapped $Li_2S$ nanoparticles, wherein the graphene-wrapped $Li_2S$ nanoparticles are prepared by a method including heating lithium metal, and a carbon-sulfur source or a carbon source and a sulfur source in a sealed container at a temperature to produce lithium vapors, and vapors of the carbon-sulfur source or vapors of the carbon source and vapors of the sulfur source; and cooling the sealed container to produce the graphene-wrapped $Li_2S$ nanoparticles. In some embodiments, the cathode further includes a current collector, a conductive carbon material, a binder, or any combination thereof.

In another aspect, provided herein are methods of preparing graphene-wrapped $Li_2S$ nanoparticles, wherein the method includes heating lithium metal, and a carbon-sulfur source or a carbon source and a sulfur source in a sealed container at a temperature to produce lithium vapors, and vapors of the carbon-sulfur source or vapors of the carbon source and vapors of the sulfur source; and cooling the sealed container to produce the graphene-wrapped $Li_2S$ nanoparticles. In some embodiments, the temperature is about 180° C. to about 800° C. In some embodiments, the method includes heating lithium metal and a carbon-sulfur source. In some embodiments, the carbon-sulfur source is $CS_2$. In some embodiments, the graphene-wrapped $Li_2S$ nanoparticles have a $Li_2S$ loading of about 1 $mg/cm^2$ to about 15 $mg/cm^2$. In some embodiments, the graphene-wrapped $Li_2S$ nanoparticles include $Li_2S$ nanoparticles encapsulated by graphene nanocages. In some embodiments, the graphene nanocages are about 50 nm to 100 nm wide. In some embodiments, the $Li_2S$ nanoparticles are uniformly distributed among and within the graphene nanocages. In some embodiments, the graphene nanocages include at least 5 graphene layers.

In another aspect, provided herein are graphene-wrapped $Li_2S$ nanoparticles prepared by any method disclosed herein.

DETAILED DESCRIPTION

Figure 1:
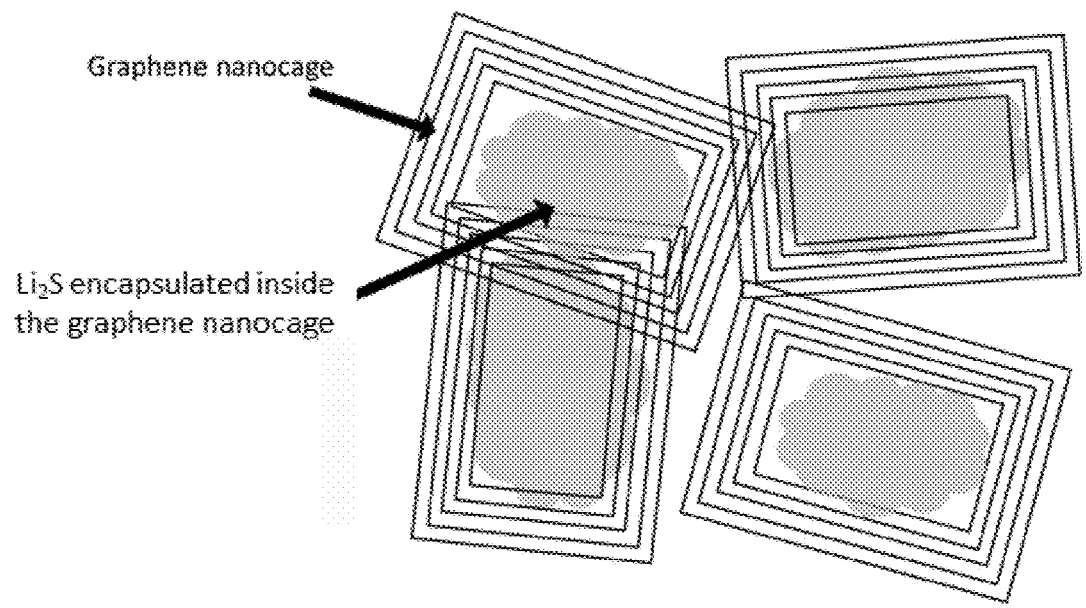
FIG. 1 depicts as-prepared graphene-wrapped $Li_2S$ nanoparticles. In this embodiment, the walls of the graphene nanocages include five layers of graphene.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Rechargeable lithium-ion batteries, since their introduction in the 1970s and their commercialization in the 1990s, have been widely used to power portable electronic devices, such as cellular phones and laptop computers. However, state-of-the-art lithium ion battery cathode materials based on the intercalation mechanism can only reach a specific capacity up to 300 mAh/g, which is not sufficient for the long-term needs of future applications such as in electric vehicles and smart grids. In contrast, lithium-sulfur (Li—S) batteries offer superior theoretical capacity (1672 mAh/g based on S and 1166 mAh/g based on $Li_2S$), which is four times that of the limit in intercalated Li-ion couples.

The earliest Li—S battery configuration was presented in the 1960s, in which the positive electrode consisted of elemental sulfur, electronic conductors and binders. The negative electrode was lithium metal and was separated from the positive electrode by a solid or non-aqueous liquid electrolyte.

Recently, lithium disulfide ($Li_2S$) cathodes have gained great attention due to a number of unique advantages. Comparing between the S cathode and the $Li_2S$ cathode, the latter does not require the use of lithium metal as the anode, thereby preventing the dendrite growth problem that leads to potential safety issues and the redox shuttles of lithium polysulfides that lead to low coulombic efficiency. The greatest challenge of using the $Li_2S$ cathode is that $Li_2S$ does not provide the full extent of its capacity in the cell because it is barely active due to its highly insulating nature. Therefore, much effort has been spent to improve the conductivity of the $Li_2S$ electrode and mitigate sulfur dissolution. For example, $Li_2S$ powder has been ball-milled or mixed with different carbon forms or metals. However, limited improvement on conductivity of $Li_2S$ particles was achieved. Although ball-milling certainly can break down the size of the particles and improve the conductivity to some degree, fine contact of $Li_2S$ particles with conductive agents, which is crucial to the activation of $Li_2S$ in cells, is difficult to obtain through this method.

Provided herein, in one aspect, are graphene-wrapped $Li_2S$ nanoparticles. The graphene-wrapped $Li_2S$ nanoparticles include $Li_2S$ nanoparticles wrapped in layers of graphene. These graphene-wrapped $Li_2S$ nanoparticles exhibit increased conductivity relative to $Li_2S$ alone.

The graphene-wrapped $Li_2S$ nanoparticles may include $Li_2S$ nanoparticles wrapped by about 1 to about 30 layers of graphene, or more. In some embodiments, the graphene-wrapped $Li_2S$ nanoparticles include $Li_2S$ nanoparticles wrapped by about 1 to about 25 layers of graphene. In some embodiments, the graphene-wrapped $Li_2S$ nanoparticles include $Li_2S$ nanoparticles wrapped by about 1 to about 20 layers of graphene. In some embodiments, the $Li_2S$ nanoparticles are wrapped by about 1 to about 15 layers of graphene. In some embodiments, the $Li_2S$ nanoparticles are wrapped by about 1 to about 10 layers of graphene. In some embodiments, the $Li_2S$ nanoparticles are wrapped by about 2 to about 20 layers of graphene. In some embodiments, the $Li_2S$ nanoparticles are wrapped by about 2 to about 15 layers of graphene. In some embodiments, the $Li_2S$ nanoparticles are wrapped by about 2 to about 10 layers of graphene. In some embodiments, the $Li_2S$ nanoparticles are wrapped by about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 layers, or more, of graphene.

The graphene-wrapped $Li_2S$ nanoparticles may include $Li_2S$ nanoparticles encapsulated in graphene nanocages. The $Li_2S$ nanoparticles may be uniformly distributed among the graphene nanocages. In some embodiments, the $Li_2S$ nanoparticles are uniformly distributed within the graphene nanocages. In some embodiments, the $Li_2S$ nanoparticles are uniformly distributed among and within the graphene nanocages. In some embodiments, the graphene nanocages include about 1 to about 30 layers of graphene. In some embodiments, the graphene nanocages include about 1 to about 25 layers of graphene. In some embodiments, the graphene nanocages include about 1 to about 20 layers of graphene. In some embodiments, the graphene nanocages include about 1 to about 15 layers of graphene. In some embodiments, the graphene nanocages include about 1 to about 10 layers of graphene. In some embodiments, the graphene nanocages include about 2 to about 20 layers of graphene. In some embodiments, the graphene nanocages include about 2 to about 15 layers of graphene. In some embodiments, the graphene nanocages include about 2 to about 10 layers of graphene. In some embodiments, the graphene nanocages include about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 layers, or more, of graphene. In some embodiments, the graphene nanocages include at least 2, 3, 4, 5, 6, 7, 8, 9, or 10 graphene layers.

The graphene nanocages may be about 20 to about 500 nm wide. This includes graphene nanocages that are about 20 to about 400 nm wide; about 20 to about 300 nm wide; about 20 to about 200 nm wide; or about 20 to about 100 nm wide. In some embodiments, the graphene nanocages are about 35 to about 500 nm wide. This includes where the graphene nanocages are about 35 to about 400 nm wide; about 35 to about 300 nm wide; about 35 to about 200 nm wide; or about 35 to about 100 nm wide. In some embodiments, the graphene nanocages are about 50 to about 500 nm wide. This includes graphene nanocages that are about 50 to about 400 nm wide; about 50 to about 300 nm wide; about 50 to about 200 nm wide; or about 50 to about 100 nm wide. In some embodiments, the graphene nanocages are about 75 to about 500 nm wide. This includes graphene nanocages that are about 75 to about 400 nm wide; about 75 to about 300 nm wide; about 75 to about 200 nm wide; or about 75 to about 100 nm wide. In some embodiments, the graphene nanocages are about 20, 25, 30, 35, 40, 45, 50, 55, 60, 65, 70, 75, 80, 85, 90, 100, 125, 150, 175, 200, 225, 250, 275, 300, 325, 350, 375, 400, 425, 450, 475, or 500 nm, including increments therein, wide.

The graphene-wrapped $Li_2S$ nanoparticles may have a $Li_2S$ loading of about 1 $mg/cm^2$ to about 15 $mg/cm^2$. This include the graphene-wrapped $Li_2S$ nanoparticles having a $Li_2S$ loading of about 1 $mg/cm^2$ to about 13 $mg/cm^2$; about 1 $mg/cm^2$ to about 10 $mg/cm^2$; about 3 $mg/cm^2$ to about 15 $mg/cm^2$; about 5 $mg/cm^2$ to about 15 $mg/cm^2$; or about 5 $mg/cm^2$ to about 10 $mg/cm^2$. In some embodiments, the graphene-wrapped $Li_2S$ nanoparticles have a $Li_2S$ loading of about 1, 2, 3, 4, 5, 6, 7, 8, 9, 10, 11, 12, 13, 14, or 15 $mg/cm^2$.

In another aspect, disclosed herein are methods to prepare the graphene-wrapped $Li_2S$ nanoparticles disclosed herein.

In some embodiments, the method includes a facile in situ synthesis involving the reaction between lithium and carbon disulfide vapors. By this method, graphene-wrapped $Li_2S$ nanoparticles with high loading of $Li_2S$ may be obtained.

In some embodiments, the method includes a sealed set-up to allow lithium vapor to react with carbon disulfide vapor according the following chemical reaction:

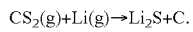

$$CS_2(g)+Li(g) \rightarrow Li_2S+C.$$

In some embodiments, after the reaction and upon cooling, graphene-wrapped $Li_2S$ nanoparticles are produced.

In some embodiments, the method to prepare graphene-wrapped $Li_2S$ nanoparticles includes heating lithium metal, and a carbon-sulfur source or a carbon source and a sulfur source in a sealed container at a temperature to produce lithium vapors, and vapors of the carbon-sulfur source or vapors of the carbon source and vapors of the sulfur source; and cooling the sealed container to produce the graphene-wrapped $Li_2S$ nanoparticles.

In some embodiments, the method includes lithium metal and a carbon-sulfur source. In other embodiments, the method includes lithium metal and a carbon source and a sulfur source. In further embodiments, the carbon source and a sulfur source is $CS_2$.

The temperature for the producing of the lithium vapors may be about 180° C. to about 800° C. This includes where the temperature is about 180° C. to about 700° C.; about 180° C. to about 600° C.; about 180° C. to about 500° C.; about 180° C. to about 400° C.; about 180° C. to about 300° C.; about 200° C. to about 800° C.; about 200° C. to about 600° C.; about 200° C. to about 400° C.; about 300° C. to about 800° C.; about 300° C. to about 600° C.; about 300° C. to about 400° C.; about 400° C. to about 800° C.; or about 400° C. to about 600° C.

In another aspect, disclosed herein are electrodes containing graphene-wrapped $Li_2S$ nanoparticles disclosed herein. In some embodiments, the electrodes are cathodes.

In some embodiments, the cathode includes graphene-wrapped $Li_2S$ nanoparticles, wherein the graphene-wrapped $Li_2S$ nanoparticles are prepared by a method including heating lithium metal, and a carbon-sulfur source or a carbon source and a sulfur source in a sealed container at a temperature to produce lithium vapors, and vapors of the carbon-sulfur source or vapors of the carbon source and vapors of the sulfur source; and cooling the sealed container to produce the graphene-wrapped $Li_2S$ nanoparticles.

In some embodiments, the cathode further includes one or more of a current collector, a conductive carbon material, and a binder.

In another aspect, disclosed herein are electrochemical devices including an electrode containing graphene-wrapped $Li_2S$ nanoparticles disclosed herein. The graphene-wrapped $Li_2S$ nanoparticles may have a high $Li_2S$ loading, and can reach most of its theoretical capacity. As used herein, "high $Li_2S$ loading" means $\geq 5$ mg/cm$^2$. In some embodiments, high $Li_2S$ loading is about 5 to about 15 mg/cm$^2$. As used herein, "low $Li_2S$ loading" means about 1-2 mg/cm$^2$. In some embodiments, the graphene-wrapped $Li_2S$ nanoparticles reach $\geq 80\%$ of theoretical capacity in the electrochemical device. In some embodiments, the electrochemical devices are lithium-sulfur (Li—S) batteries. In some embodiments, the electrochemical devices are primary batteries, secondary batteries, or capacitors.

The secondary battery or cathode described herein may be an "as-prepared" secondary battery and cathode. As used herein, "as-prepared" refers to a cathode or battery, as prepared, prior to any charging of the battery or cathode, or discharging of the battery or cathode. The "as-prepared" does not imply any sort of time constraint, or in other words, the cathode or battery may actually have been prepared long ago, but it was not subjected to any charging or discharging process. Accordingly, the as-prepared cathode or battery has not been subjected to electrochemical processes that would generate any lithium species or other species that were included in the battery or cathode in the first instance. In some embodiments, the secondary battery is a non-discharged secondary battery. In other embodiments, the cathode is a non-discharged cathode.

In some embodiments, the electrochemical device includes a cathode comprising graphene-wrapped $Li_2S$ nanoparticles, wherein the graphene-wrapped $Li_2S$ nanoparticles are prepared by a method including heating lithium metal, and a carbon-sulfur source or a carbon source and a sulfur source in a sealed container at a temperature to produce lithium vapors, and vapors of the carbon-sulfur source or vapors of the carbon source and vapors of the sulfur source; and cooling the sealed container to produce the graphene-wrapped $Li_2S$ nanoparticles.

In some embodiments, the electrochemical device further includes an anode and a separator. In some embodiments, the electrochemical device further includes an anode, a separator, and an electrolyte.

The anode may be formed of an anode active material. In some embodiments, the anode includes an anode active material. In some embodiments, the anode further includes one or more of a current collector, a conductive carbon material, and a binder. In some embodiments, the anode includes lithium metal. In some embodiments, the anode is a metallic lithium anode. In some embodiments, the anode is substantially free of metallic lithium. In some embodiments, substantially free of metallic lithium means less than or equal to about 10%, 9%, 8%, 7%, 6%, 5%, 4% 3%, 2%, 1%, or 0.5%, or less, including increments therein, of metallic lithium. In some embodiments, the anode active material is a material that is configured to be lithiated from about 0 V to 2.0 V versus lithium, with a high capacity material such as carbonaceous materials (e.g., graphite, amorphous carbon), Si, Si—C, SiO, P, Sn, tin oxides, composite tin alloys, other metal alloys, transition metal oxides, lithium metal nitrides or lithium metal oxide.

Illustrative conductive carbon materials include, but are not limited to, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls 2000, Denka Black, Vulcan XC72R, and Ketjenblack.

The current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the graphene-wrapped $Li_2S$ nanoparticles disclosed herein and one or more of a conductive carbon material and a binder are contacted with the current collector by casting, pressing, or rolling the mixture thereto.

When used, the binder may be present in the electrode in an amount of from about 0.1 wt. % to about 99 wt. %. In some embodiments, the binder is present in the electrode in an amount of from about 5 wt. % to about 20 wt. %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

Illustrative separators include, but are not limited to, polyethylene, polypropylene, and polyvinylidene fluoride (PVDF).

The electrolyte may include a solvent and a salt. Suitable solvents for use in the electrolytes are typically polar aprotic solvents. Illustrative solvents include, but are not limited to, ethylene carbonate (EC), dimethylcarbonate (DMC), diethylcarbonate (DEC), propylene carbonate (PC), dioxane, γ-butyrolactone, δ-butyrolactone, dimethyl ether, a silane, siloxane N-methyl acetamide, acetonitrile, an acetal, a ketal, ester, a carbonate (e.g., cyclic alkyl, acyclic alkyl), a sulfone, a sulfite, sulfolane, an aliphatic ether, a cyclic ether, a glyme, a polyether, a phosphate ester, a siloxane, a N-alkylpyrrolidone, fluoro ether and fluoro ester, fluoroethylene carbonate, and adiponitrile. In some embodiments, a mixture of any two or more such solvents is used. In some embodiments, the solvent is a mixture of solvents such as, but not limited to, EC-DMC, EC-DEC, EC-PC, EC-PC-DMC, EC-PC-DEC, or EC-DEC-DMC. In some embodiments, fluorinated derivatives of the above solvents are used. Suitable salt materials include, but are not limited to, a lithium salt, a sodium salt, an ammonium salt, an alkylammonium salt, a lithium polysulfide, or a lithium polyselenide. Illustrative salts are $LiPF_6$, $LiClO_4$, $(C_4BO_8Li)$, $(C_2BO_4F_2Li)$, $LiPF_4C_2O_4$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n}H_{n'}$, where X is a halogen, n is an integer from 0 to 12, and n' is an integer from 0 to 10, $LiAlF_4$, $LiBF_4$, $Li(FSO_2)_2N$, $Li_2SO_4$, $Na_2SO_4$, $NaPF_6$, $NaClO_4$, $LiAlO_2LiSCN$, LiBr, LiI, $LiAsF_6$, $LiB(Ph)_4$, $LiSO_3CH_3$, $(LiS_{x''}R)_y$, or $(LiSe_{x''}R)_y$; wherein x" is an integer from 1 to 20, y is an integer from 1 to 3 and R is H, alkyl, alkenyl, aryl, ether, F, $CF_3$, $COCF_3$, $SO_2CF_3$, and $SO_2F$.

The present invention, thus generally described, will be understood more readily by reference to the following examples, which are provided by way of illustration and are not intended to be limiting of the present invention.

EXAMPLES

Example 1

In Situ Synthesis of Graphene Wrapped $Li_2S$ Particles

Lithium metal and $CS_2$ liquid were sealed in a set-up and heated to their vapor states. The temperature was raised to 400° C. or 600° C. for 4-24 hours to allow complete reaction of Li and $CS_2$ to produce $Li_2S$ nanoparticles wrapped by graphene nanocages upon cooling (FIG. 1). Control of the vapor flow and reaction temperature led to control of the particle size of the graphene-wrapped $Li_2S$ nanoparticles.

Figure 2:
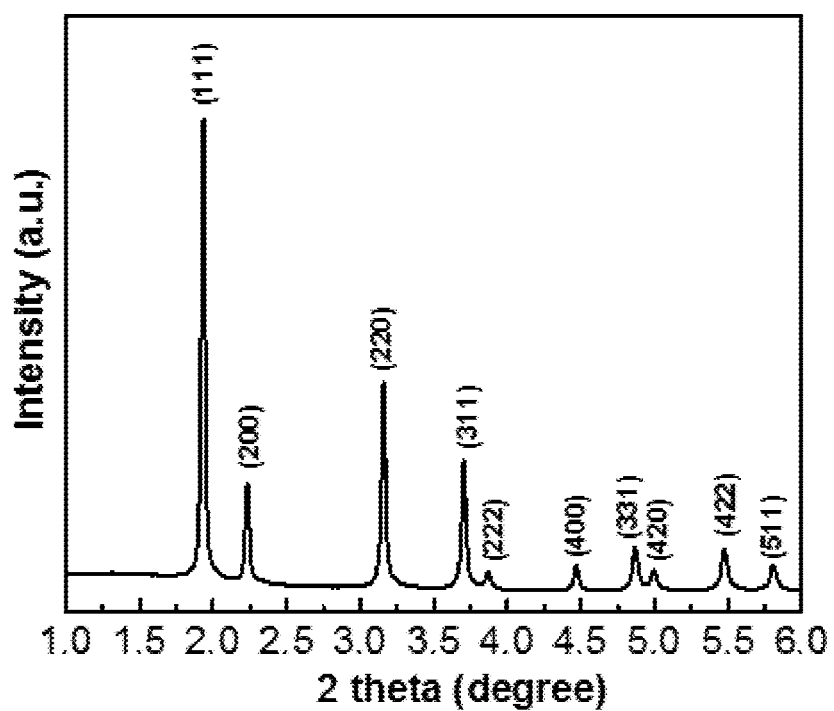
FIG. 2 depicts representative X-ray diffraction patterns of as-prepared graphene-wrapped $Li_2S$ nanoparticles.
Figure 3A:
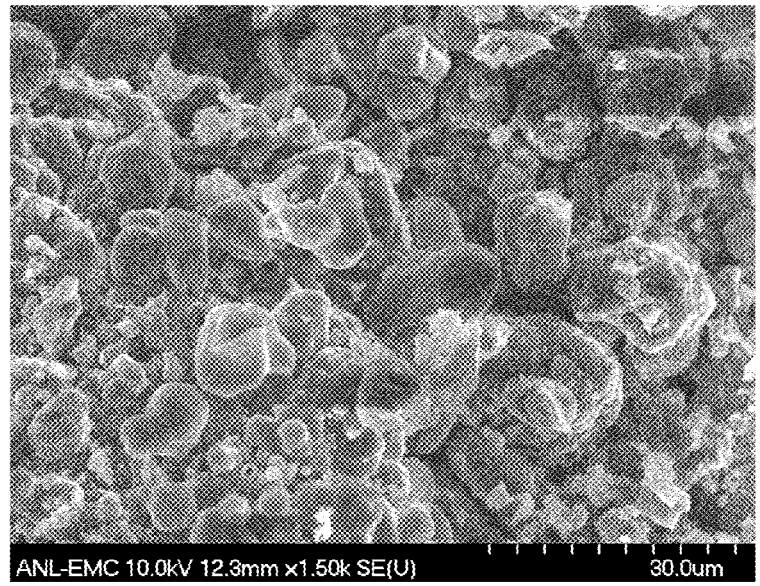
FIGS. 3A and 3B depict representative SEM images of (3A) as-prepared graphene-wrapped $Li_2S$ particles and (3B) porous graphene nanocage-confined $Li_2S$ composite prepared according to US 2014/0272610 for comparison.
Figure 3B:
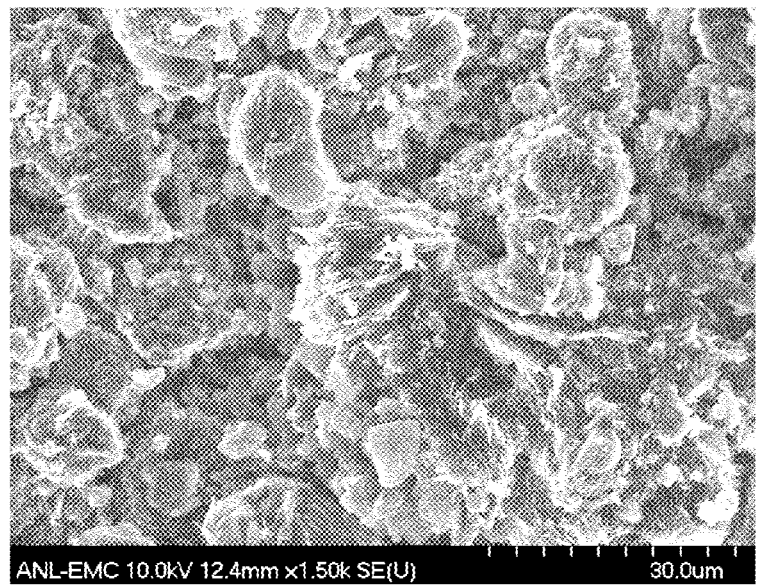
Figure 4A:
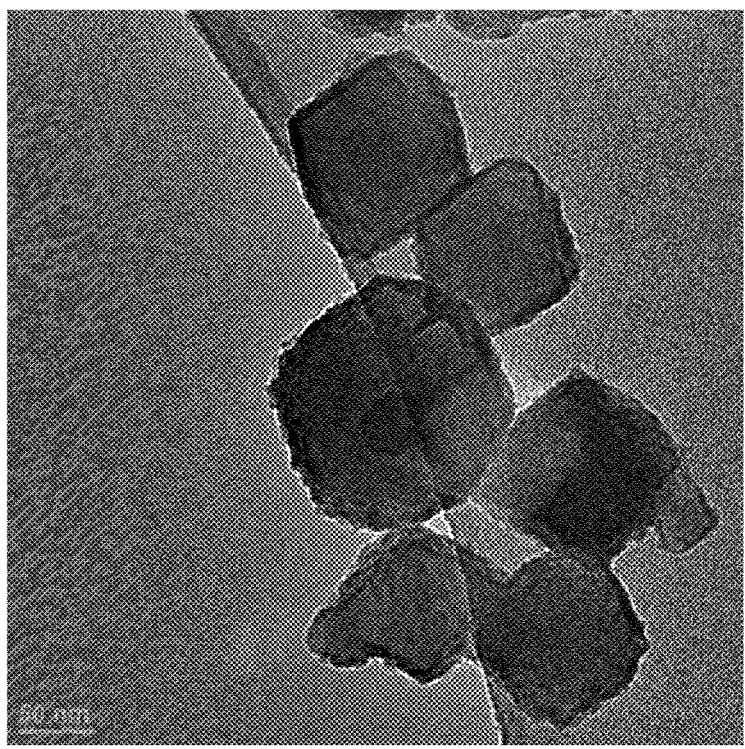
FIGS. 4A and 4B depict representative (4A) low magnification and (4B) high-magnification TEM images of as-prepared graphene-wrapped $Li_2S$ nanoparticles.
Figure 4B:
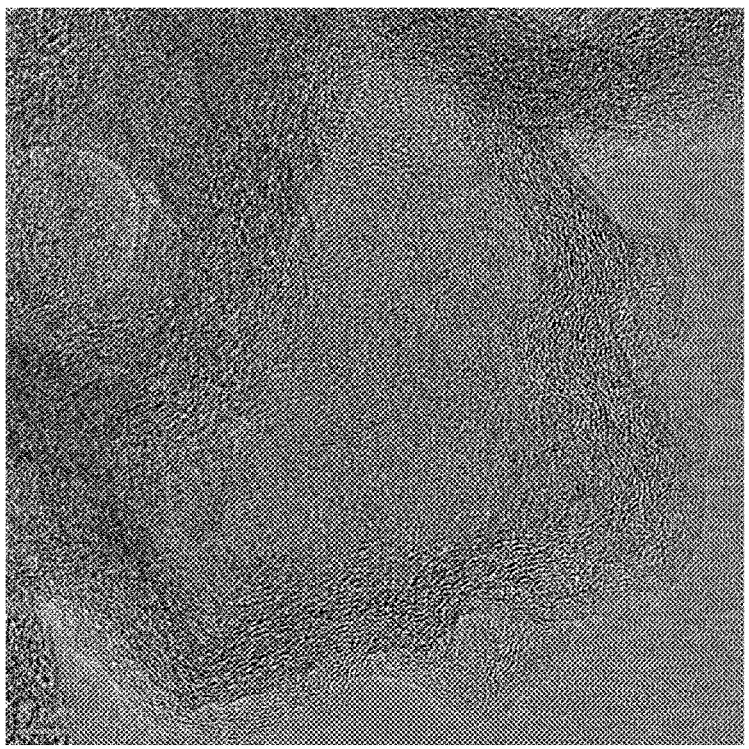

Analysis of the x-ray diffraction patterns (FIG. 2) confirmed the presence of $Li_2S$. The SEM image of these graphene-wrapped $Li_2S$ nanoparticles (FIG. 3a) suggests that these nanoparticles have a more uniform particle distribution than the $Li_2S$/graphene composite material prepared from an alternative method (US 2014/0272610) (see FIG. 3b). Because the electron beam easily damages the $Li_2S$ structures, and only the graphene nanocage remained under intense electron beam exposure, low-dose TEM imaging was required for analysis of the sample. The transmission electronic microscopy (TEM) images of FIGS. 4a and 4b indicate $Li_2S$ encapsulation by graphene nanocages. The size of the nanocages is typically 100-200 nm. Wall thickness was observed to be about 5-7 nm, corresponding to about 10 to 20 graphitic layers. The graphitic layers contained many defects due to low growth temperature.

Figure 5A:
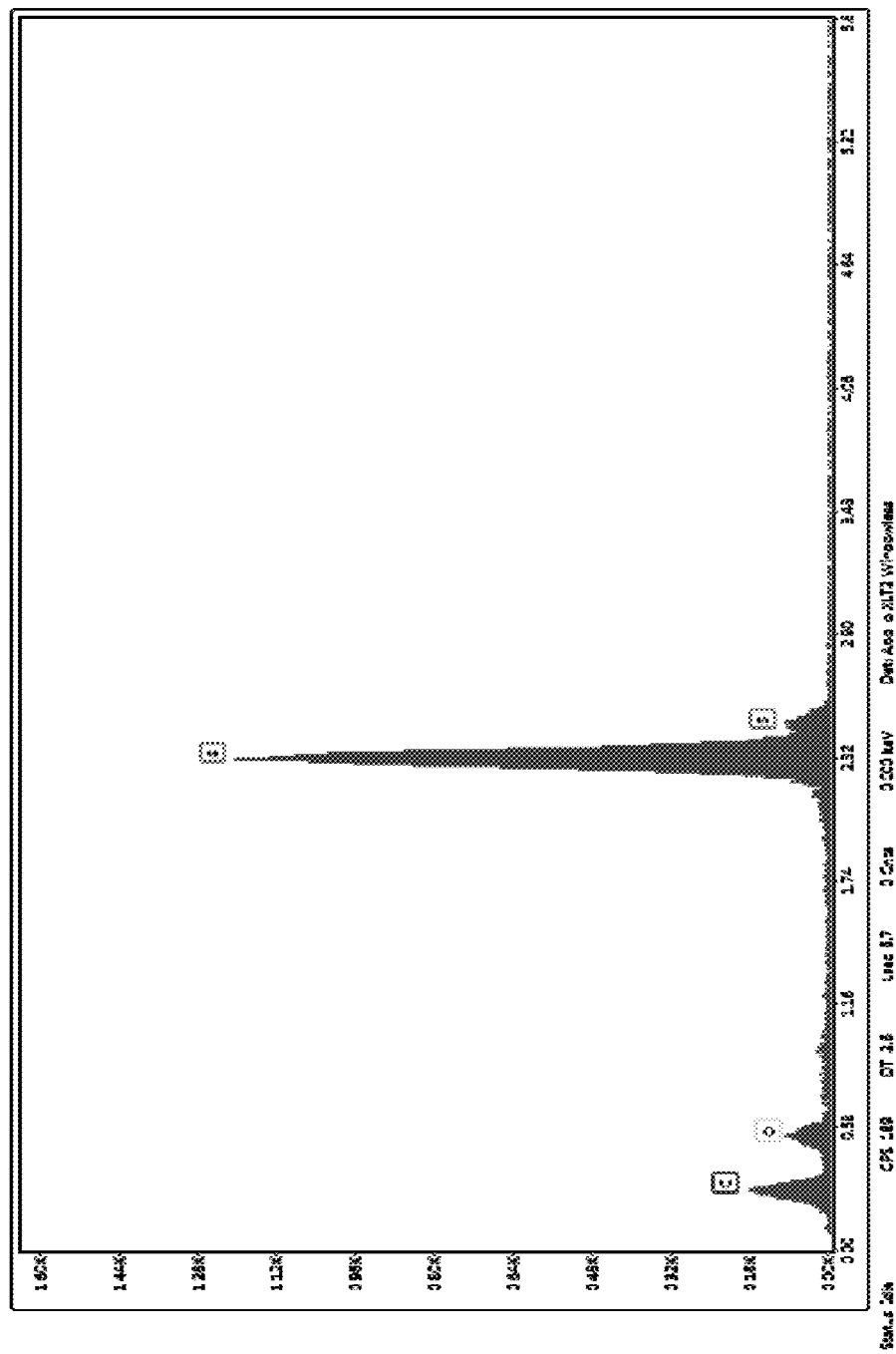
FIG. 5A depicts EDS results of as-prepared graphene-wrapped $Li_2S$ nanoparticles.
Figure 5B:
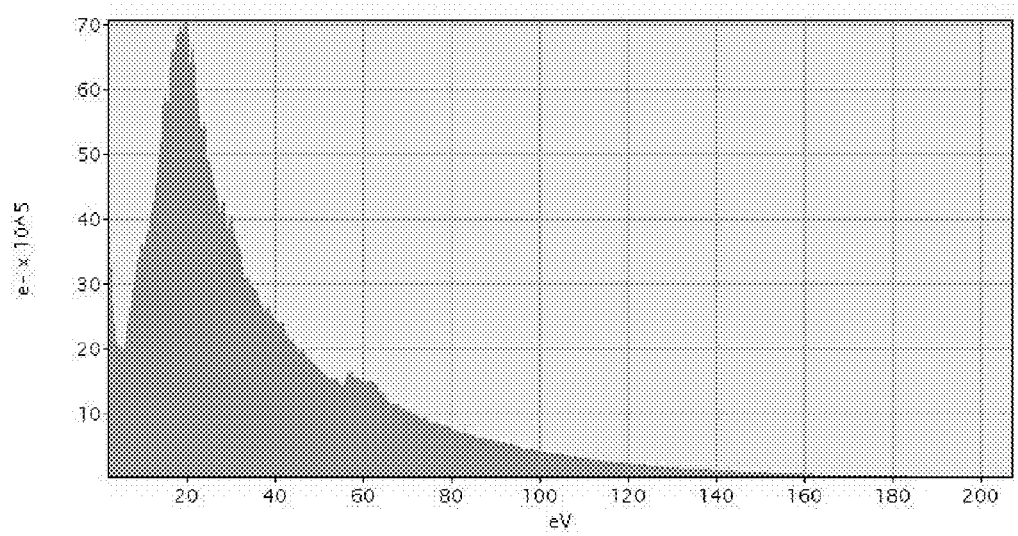
FIG. 5B depicts EELS results of as-prepared graphene-wrapped $Li_2S$ nanoparticles.
Figure 6A:
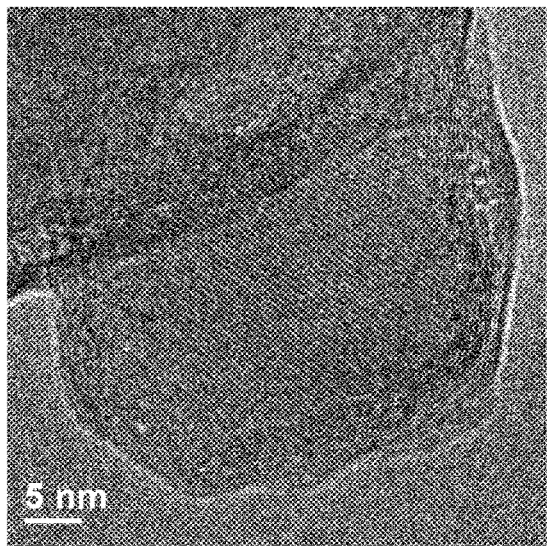
FIGS. 6A and 6B depict representative low-dose HRTEM images of as-prepared graphene-wrapped $Li_2S$ nanoparticles.
Figure 6B:
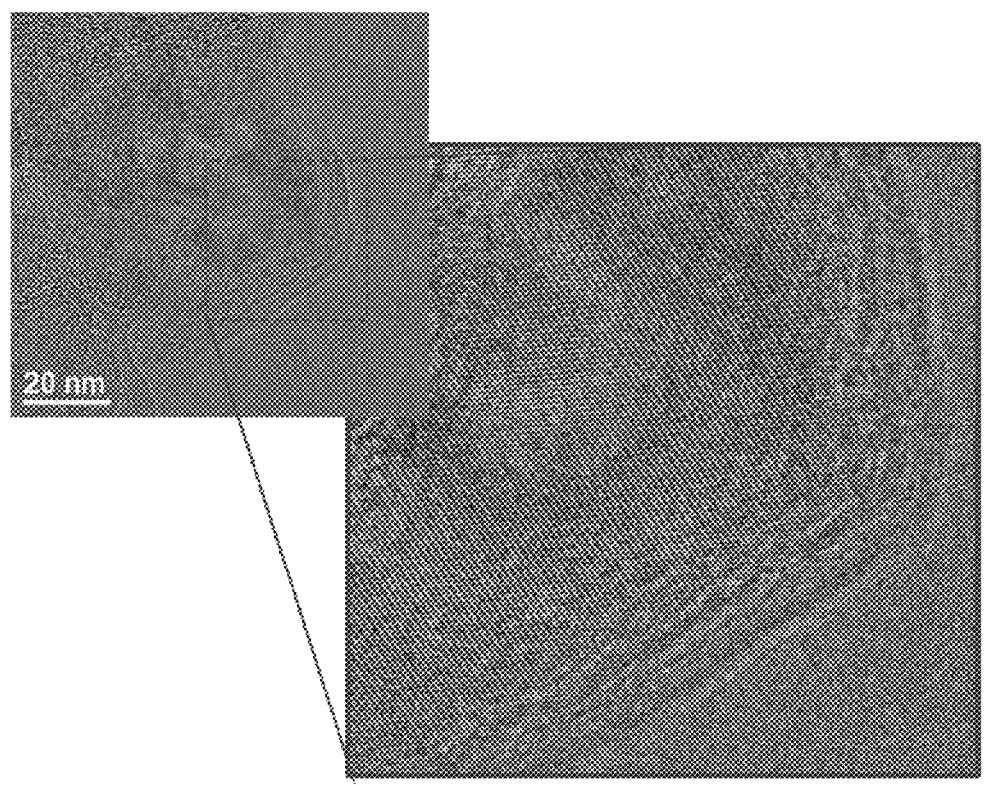
Figure 7A:
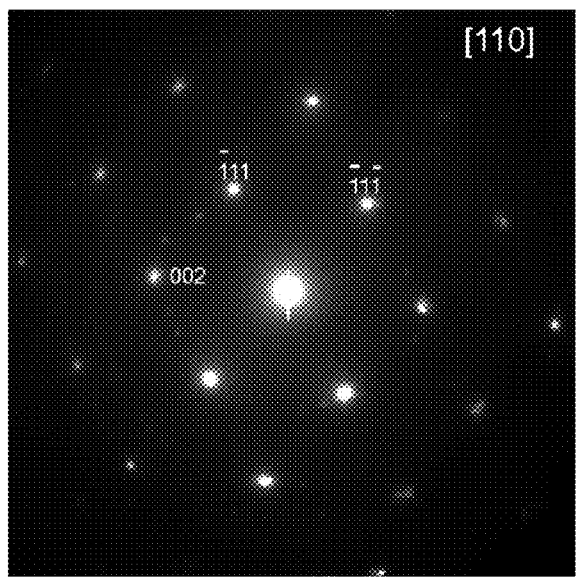
FIGS. 7A and 7B depict selected-area electron diffraction of as-prepared graphene-wrapped $Li_2S$ nanoparticles.
Figure 7B:
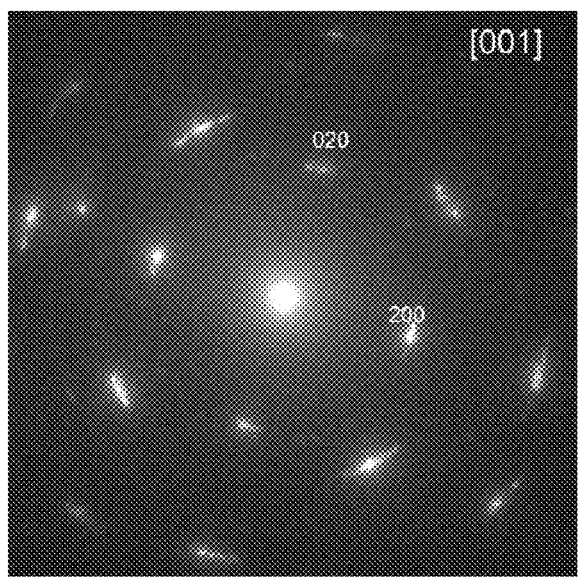

Electron diffraction spectroscopy (EDS) (FIG. 5a) revealed the high sulfur content in the encapsulated materials, consistent with $Li_2S$ grains. A small amount of oxygen was also detected. However, lithium cannot be detected by EDS. Electron energy loss spectroscopy (EELS) (FIG. 5b) revealed the presence of lithium in the encapsulated material. Although not quantitative, the EDS and EELS measurements were consistent with $Li_2S$. Low-dose high-resolution transmission electron microscopy (HRTEM) (FIGS. 6a and 6b) revealed details of the structure of the as-prepared graphene-wrapped $Li_2S$ nanoparticles. Both $Li_2S$ nanocrystals and graphene layers were observed. $Li_2S$ was encapsulated by graphene nanocages with about 10 graphitic layers. Selected-area electron diffraction (FIGS. 7A and 7B) confirmed the encapsulated material to be $Li_2S$ with an FCC structure.

Example 2

Investigation of a $Li_2S$ Battery with Graphene-wrapped $Li_2S$ Nanoparticles

Figure 8:
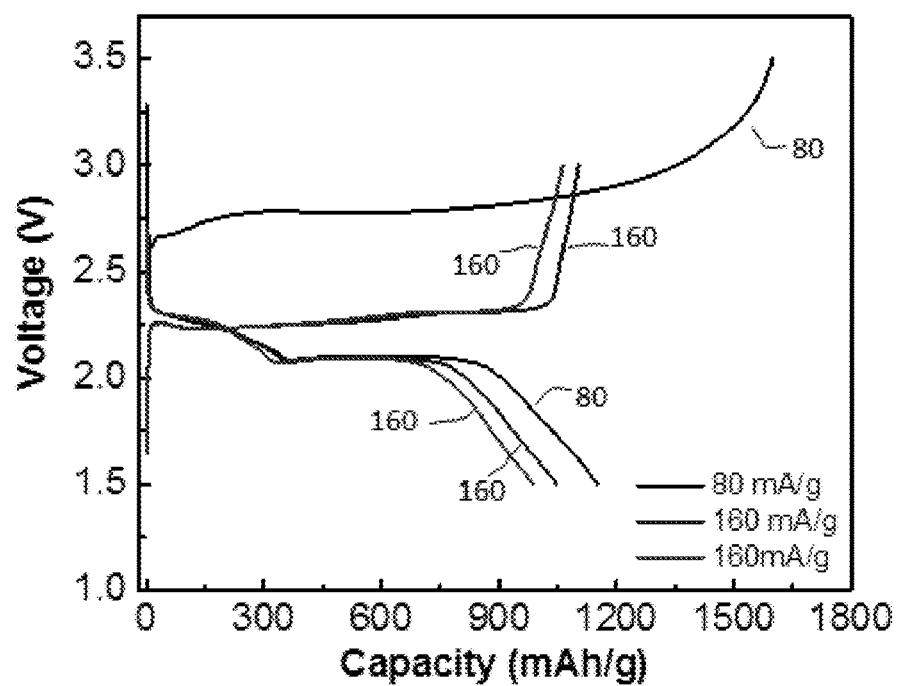
FIG. 8 depicts representative charge-discharge voltage profiles of a $Li_2S$ battery containing the as-prepared graphene-wrapped $Li_2S$ nanoparticles as the cathode active material.

The cathode was composed of 85% graphene-wrapped $Li_2S$ nanoparticles, 10% carbon black, and 5% PVDF 5130. $Li_2S$ loading was 5-15 mg/cm$^2$ (equivalent to 76.5% $Li_2S$ in the laminate). The anode was lithium metal. The electrolyte was 1 M lithium bis(trifluoromethanesulfonyl)-imide (LiTFSI) in partially fluorinated solvent 1,1,2,2-tetrafluoro-3-(1,1,2,2-tetrafluoroethoxy)-propane (D2)/1,3-dioxolane (DOL) (v/v=2/1). The test current was 80 mA/g for the first cycle and 160 mA/g for the rest cycles, and the test voltage window was between 1.5 and 3.5 V for all cycles. FIG. 8 shows the charge-discharge voltage profiles of this $Li_2S$ battery. In the formation cycle in which $Li_2S$ was initially oxidized electrochemically to S, the charge capacity was over 1500 mAh/g, and the first discharge capacity was about 1180 mAh/g (the capacity was calculated based on sulfur weight in the cathode). In the $2^{nd}$ and $3^{rd}$ cycles, the charge and discharge capacities of the cell was about 1100 mAh/g and 1050 mAh/g, corresponding to coulombic efficiencies of about 95%.

Example 3

Investigation of a $Li_2S$ Battery with Graphene-wrapped $Li_2S$ Nanoparticles

Figure 9:
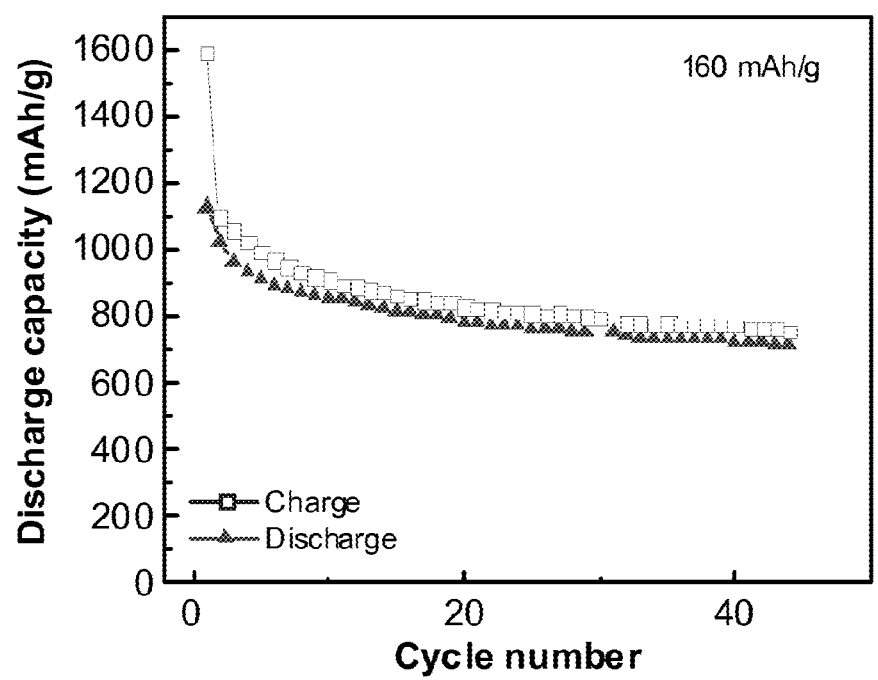
FIG. 9 depicts representative cycling performance of a $Li_2S$ battery containing the as-prepared graphene-wrapped $Li_2S$ nanoparticles as the cathode active material.

Cycling performance of the $Li_2S$ battery of Example 2 was examined (FIG. 9). In the initial formation cycle, the charge capacity was about 1600 mAh/g, and the first discharge capacity was about 1170 mAh/g (the capacity was calculated based on sulfur weight in the cathode). In the $2^{nd}$ cycle, the discharge and charge capacities were about 1050 mAh/g, and after 10 cycles, the capacity was stabled at about 800 mAh/g. The coulombic efficiency of the cell was about 95% except for the initial cycle.

Comparative Example 1

Figure 10:
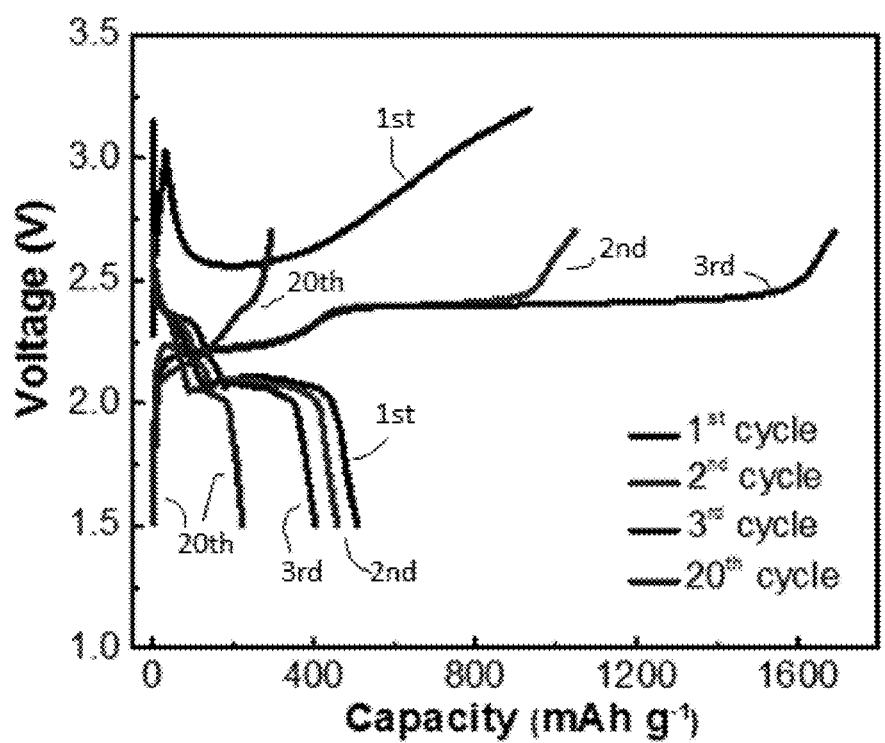
FIG. 10 depicts representative charge-discharge voltage profiles of a $Li_2S$ battery containing $Li_2S$ particles without graphene wrapping as described in US 2014/0272610 as the cathode active material.

A lithium sulfur coin cell was prepared using cathode active material containing $Li_2S$ particles without graphene wrapping (as disclosed in US 2014/0272610). The cathode was composed of 40% $Li_2S$ powder, 50% carbon black, and 10% PVDF 1120. $Li_2S$ loading was 0.5-1 mg. The anode was lithium metal. The electrolyte was 1 M lithium bis (trifluoromethanesulfonyl)-imide (LiTFSI) dissolved in a mixture of 1,3-dioxolane (DOL) and 1,2-dimethoxyethane ether (DME) solvents (1:1 ratio by volume). The test current was 120 mA/g (which corresponds to approximately a C/10 charge/discharge rate), and the test voltage window was between 1.5 and 2.7 V from the second cycle. The charge-discharge voltage profiles of this battery are shown in FIG. 10. In the initial charge, the voltage quickly reached 3.0 V and then declined to 2.6 V followed by a plateau and then rose to 3.0 V. For this reason a higher cutoff voltage (3.2 V) was applied for the initial charge in order to activate $Li_2S$. This barrier did not appear in the subsequent cycles. The initial discharge capacity of the cell was in the range of 500 mAh/g which dropped to about 200 mAh/g at the $20^{th}$ cycle (the capacity was calculated based on sulfur weight in the cathode). In contrast, the charge capacities of the cell were much higher than the discharge capacities in the cell for all of the cycles. This resulted in extremely low coulombic efficiency. The redox shuttle reaction reached its maximum in the $3^{rd}$ cycle where ~1700 mAh/g of charge capacity could be achieved compared to ~400 mAh/g of discharge capacity, which resulted in a very low coulombic efficiency of 23%.

Comparative Example 2

Figure 11:
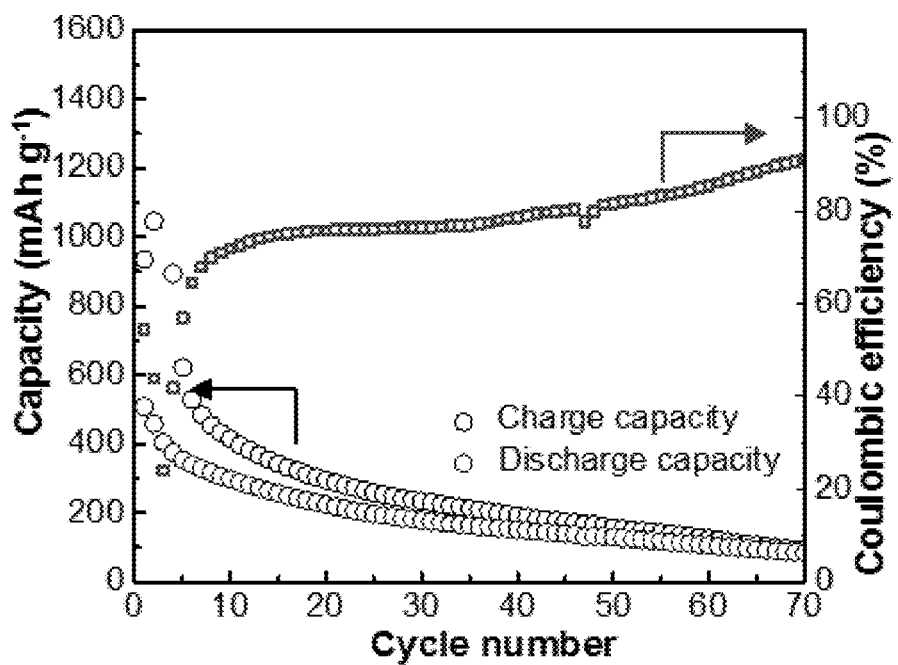
FIG. 11 depicts representative cycling performance of a $Li_2S$ battery containing $Li_2S$ particles without graphene wrapping as described in US 2014/0272610 as the cathode active material.

The cycling performance of the $Li_2S$ battery of Example 4 is depicted in FIG. 11. The test current was 120 mA/g (which corresponded to approximately a C/10 charge/discharge rate), and the test voltage window was between 1.5 and 2.7 V from the second cycle. In the initial charging process, the cell was charged to 3.2 V to electrochemically activate $Li_2S$ particles. The discharge capacities of the cell dropped from around 500 mAh/g to less than 100 mAh/g after 70 cycles (the capacity was calculated based on sulfur weight in the cathode). Meanwhile, the redox shuttle reaction was severe in the cell and reached its minimum in the $3^{rd}$ cycle with a very low coulombic efficiency of 23%.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:
1. A method of preparing graphene-wrapped $Li_2S$ nanoparticles, the method comprising:
heating lithium metal and a carbon-sulfur source or lithium metal, a carbon source, and a sulfur source in a sealed container at a temperature to produce lithium vapors and vapors of the carbon-sulfur source, or lithium vapors, vapors of the carbon source, and vapors of the sulfur source; and cooling the sealed container to produce the graphene-wrapped $Li_2S$ nanoparticles.

2. The method of claim 1, wherein the temperature is about 180° C. to about 800° C.

3. The method of claim 1, wherein the method comprises heating lithium metal and a carbon-sulfur source.

4. The method of claim 3, wherein the carbon-sulfur source is $CS_2$.

5. The method of claim 1, wherein the graphene-wrapped $Li_2S$ nanoparticles have a $Li_2S$ loading of about 1 $mg/cm^2$ to about 15 $mg/cm^2$.

6. The method of claim 1, wherein the graphene-wrapped $Li_2S$ nanoparticles comprise $Li_2S$ nanoparticles encapsulated by graphene nanocages.

7. The method of claim 6, wherein the graphene nanocages are about 50 nm to 100 nm wide.

8. The method of claim 6, wherein the $Li_2S$ nanoparticles are uniformly distributed among and within the graphene nanocages.

9. The method of claim 6, wherein the graphene nanocages comprise at least 5 graphene layers.

10. Graphene-wrapped $Li_2S$ nanoparticles prepared by the method of claim 1.

11. A cathode comprising the graphene-wrapped $Li_2S$ nanoparticles of claim 10.

12. The cathode of claim 11, further comprising a current collector, a conductive carbon material, a binder, or any combination thereof.

* * * * *